United States Patent
Henshall et al.

(10) Patent No.: US 10,318,615 B1
(45) Date of Patent: Jun. 11, 2019

(54) MODELING AND MEASURING BROWSER PERFORMANCE USING REFERENCE PAGES

(71) Applicant: Amazon Technologies, Inc., Reno, NV (US)

(72) Inventors: Dane Samuel Lightheart Henshall, Vancouver (CA); Aaron-Kenneth Karl Rehaag, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 612 days.

(21) Appl. No.: 14/308,583

(22) Filed: Jun. 18, 2014

(51) Int. Cl.
*G06F 3/00* (2006.01)
*G06F 17/22* (2006.01)

(52) U.S. Cl.
CPC ................ *G06F 17/2247* (2013.01)

(58) Field of Classification Search
CPC ............. G06F 17/22; G06F 17/2247
See application file for complete search history.

(56) References Cited

U.S. PATENT DOCUMENTS

| | | | | |
|---|---|---|---|---|
| 6,665,634 | B2 * | 12/2003 | Taft | G06F 17/30899 702/186 |
| 6,738,813 | B1 | 5/2004 | Reichman | |
| 6,928,472 | B1 * | 8/2005 | Wen | H04L 41/5009 370/241 |
| 7,197,559 | B2 | 3/2007 | Goldstein et al. | |
| 7,685,270 | B1 * | 3/2010 | Vermeulen | G06Q 30/0603 370/252 |
| 7,895,293 | B1 * | 2/2011 | Vasilik | G06Q 30/02 705/14.4 |
| 8,065,410 | B1 * | 11/2011 | Breen | H04L 67/025 702/182 |
| 8,296,643 | B1 * | 10/2012 | Vasilik | G06F 17/3089 715/200 |

(Continued)

FOREIGN PATENT DOCUMENTS

WO   WO 2015081988 A1 *   6/2015   ............ H04L 67/02

OTHER PUBLICATIONS

Kyle, Apr. 23, 2014, http://blog.gsmarena.com/windows-phone-8-1-synthetic-benchmarks/ (Windows phone 8.pdf), pp. 1-15 (Year: 2014).*

*Primary Examiner* — Kyle R Stork
(74) *Attorney, Agent, or Firm* — Knobbe Martens Olson & Bear LLP

(57) ABSTRACT

A user device and server automatically test the performance of a browser. For example, at the request of a user or developer, the user device retrieves and loads a set of reference pages that are used to individually measure and record the performance of the browser as one content parameter is varied and the remaining content parameters are held constant. The performance of the browser may be measured in terms of page processing time. Based on the measured page processing times, the server may determine a relationship between each parameter and a page processing time. The server then develops a model for estimating the page load time of an actual page using the determined relationships. To estimate the page load time of an actual page, the server determines values for the content parameters associated with the actual page and applies those values to the developed model.

26 Claims, 5 Drawing Sheets

(56) References Cited

U.S. PATENT DOCUMENTS

| | | | | |
|---|---|---|---|---|
| 8,782,214 B1* | 7/2014 | Lopez | G06F 17/3089 | 709/224 |
| 8,943,473 B1* | 1/2015 | Duraisamy | G06F 8/51 | 717/111 |
| 9,087,035 B1* | 7/2015 | Bandaru | G06F 17/248 | |
| 9,258,203 B1* | 2/2016 | Goodwin | H04L 41/5035 | |
| 9,400,774 B1* | 7/2016 | Kim | G06F 17/24 | |
| 2002/0184363 A1* | 12/2002 | Viavant | H04L 29/06 | 709/224 |
| 2002/0188717 A1* | 12/2002 | Mushlin | G06F 11/3447 | 709/224 |
| 2003/0061283 A1* | 3/2003 | Dutta | G06F 17/3089 | 709/204 |
| 2003/0065986 A1* | 4/2003 | Fraenkel | G06F 11/3006 | 714/47.2 |
| 2004/0064293 A1* | 4/2004 | Hamilton | G06F 11/3409 | 702/182 |
| 2004/0260807 A1* | 12/2004 | Glommen | G06F 11/3495 | 709/224 |
| 2005/0154980 A1* | 7/2005 | Purvis | G06T 11/60 | 715/229 |
| 2005/0216234 A1* | 9/2005 | Glas | G06F 11/3414 | 702/186 |
| 2008/0104224 A1* | 5/2008 | Litofsky | G06F 17/3089 | 709/224 |
| 2008/0275980 A1* | 11/2008 | Hansen | G06Q 30/02 | 709/224 |
| 2009/0150385 A1* | 6/2009 | Clary | G06F 11/3452 | |
| 2010/0070498 A1* | 3/2010 | Zhang | G06F 17/30864 | 707/736 |
| 2010/0313183 A1* | 12/2010 | Ellen | G06F 8/30 | 717/110 |
| 2010/0333072 A1* | 12/2010 | Dulip | G06F 11/3419 | 717/128 |
| 2011/0016205 A1* | 1/2011 | DeBettencourt | H04L 67/22 | 709/224 |
| 2011/0054878 A1* | 3/2011 | Zhang | G06F 11/3419 | 703/21 |
| 2011/0109643 A1* | 5/2011 | Bettis | G06F 17/3089 | 345/589 |
| 2011/0119330 A1* | 5/2011 | Baldwin | G06F 17/30902 | 709/203 |
| 2012/0066586 A1* | 3/2012 | Shemesh | G06F 17/30902 | 715/235 |
| 2012/0079361 A1* | 3/2012 | Itoko | G06F 17/3089 | 715/205 |
| 2012/0089544 A1* | 4/2012 | Zeine | G06N 99/005 | 706/13 |
| 2012/0124199 A1* | 5/2012 | Mahesh | G06F 3/0613 | 709/224 |
| 2013/0013775 A1* | 1/2013 | Baumback | H04L 43/0811 | 709/224 |
| 2013/0073401 A1* | 3/2013 | Cook | G06Q 30/02 | 705/14.73 |
| 2013/0191450 A1* | 7/2013 | Bodenhamer | G06F 17/30899 | 709/203 |
| 2013/0227078 A1* | 8/2013 | Wei | H04L 67/02 | 709/219 |
| 2013/0318227 A1* | 11/2013 | Feng | H04L 43/0876 | 709/224 |
| 2014/0129697 A1* | 5/2014 | Tuovinen | H04L 43/106 | 709/224 |
| 2014/0280182 A1* | 9/2014 | Anderson | G06F 11/3495 | 707/741 |
| 2015/0026239 A1* | 1/2015 | Hofmann | H04L 67/1095 | 709/203 |
| 2015/0039416 A1* | 2/2015 | Sullivan | G06Q 30/0276 | 705/14.43 |
| 2015/0149621 A1* | 5/2015 | Butler | H04L 67/22 | 709/224 |
| 2015/0193815 A1* | 7/2015 | Juda | G06Q 30/0275 | 705/14.43 |
| 2015/0242379 A1* | 8/2015 | Kuivinen | H04L 43/0852 | 715/234 |
| 2015/0332147 A1* | 11/2015 | Anastas | G06N 5/04 | 706/12 |
| 2016/0147632 A1* | 5/2016 | Vazac | G06F 11/3495 | 702/122 |

* cited by examiner

MODELING AND MEASURING BROWSER PERFORMANCE USING REFERENCE PAGES

BACKGROUND

When a user requests a web page or other content page via a browser, the browser typically performs a series of steps to display the page. The browser may request content resources from a host server, parse the page's code, and render the page. Furthermore, the page may include embedded objects that are separately retrieved by the browser. In some cases, the user may experience a noticeable delay before the page is fully or even partially displayed. Any or all of the steps performed by the browser to display the page may contribute to this delay. When the delay is significant (e.g., several seconds or more), the task of browsing can be frustrating for users.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
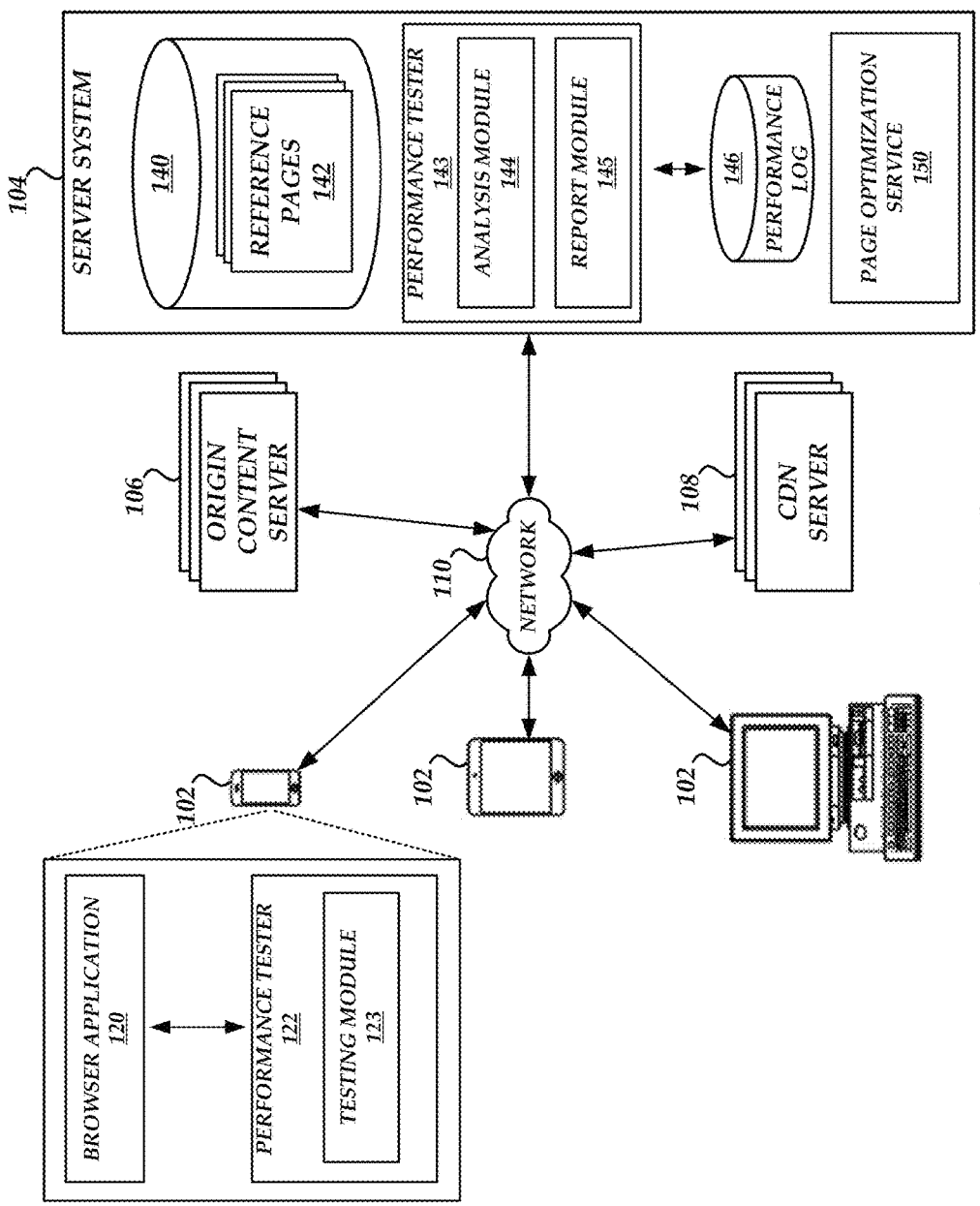
FIG. 1 illustrates a browser testing environment with a user device that tests the performance of a browser using a set of reference pages provided by a server according to one embodiment.

As described above, the task of browsing can be frustrating for users when there is a significant delay in displaying a page (e.g., a content page or a network page, such as a web page). The delay can be caused by various factors. These factors include, for example, (1) the speed of the wireless or wired connection between the user device and the Internet, (2) the location of, and load on, the origin server that hosts the page, (3) the size of the page, including any embedded graphics, (4) whether, and the extent to which, the page includes embedded objects that need to be separately retrieved (possibly from different domains) once the page's HTML has been loaded, (5) the complexity of the page's coding, including any scripts, and (6) the processing power of the user device. The architecture of a browser running on a user device may dictate how these factors ultimately affect the performance of the browser and the delay experienced by the user.

While the architecture of the browser may affect the user experience, developers are typically unable to accurately or adequately predict how changes to the architecture will affect the performance of the browser. In some cases, developers merely load a list of current pages and measure the browser's performance after changes to the architecture have been made. This method, though, may be a poor representation of how the browser will perform for all pages and may only detect significant or obvious differences in performance. Furthermore, this method may not indicate what portion of the architecture or what steps performed by the browser may be degrading (or improving) the browser performance.

Accordingly, the embodiments described herein include automated systems and methods for more accurately testing the performance of a browser. In some embodiments, a browser is installed on an actual or emulated user device together with a component that, at the request of a user or developer, automatically (1) directs the browser to load a set of reference pages, and (2) measure the browser's performance as it loads each reference page (e.g., in terms of page processing time). Reference pages may be pages specifically constructed for testing a browser and may not otherwise be available publicly over a network. Different subsets of the reference pages may be configured to test how the browser's performance is affected by different content parameters. For example, one subset of reference pages may test how the browser's performance is affected by the size of a page (e.g., in bytes), while another subset may test how the browser's performance is affected by JavaScript complexity.

Each subset of reference pages may test how a single content parameter affects performance by varying the single content parameter over different values. Other content parameters may be held constant. Content parameters may be parameters that define a page. For example, content parameters may include a page size (e.g., including sub-parameters, such as the size of each content type (e.g., JavaScript, HTML, images, CSS, etc.)), a number of resources (e.g., including sub-parameters, such as a number of resources of each type (e.g., CSS, image, audio, embedded video, JavaScript, etc.)), code or script complexity (e.g., including sub-parameters, such as the depth of a parse tree, types of tags, number of elements, etc.), a number of domains from which page content elements are retrieved, a connection speed, packet loss, and/or the like.

Based on the measured page processing times, the user device or a server may determine a relationship between each parameter and a page processing time (e.g., using machine learning techniques). For example, the user device can perform an analysis based on the measured page processing times. Alternatively, the user device can transmit the measured page processing times to the server, and the server can perform the analysis.

The user device or server may then develop a model for estimating the page load time of an actual page (e.g., a page currently publicly or privately available over a network) using the determined relationships. For example, the model may include weights associated with each parameter, where the weights are calculated based on the determined relationship between a respective parameter and a page processing time. To estimate the page load time of an actual page, the server may determine values for the content parameters associated with the actual page and apply those values to the developed model.

In some embodiments, the user device or server generates a report that textually or graphically indicates how the performance of the browser has changed based on the results of the applied model. Alternatively or in addition, the user device or server can identify what aspects of the architecture of the browser affect performance (e.g., what aspects cause increased or decreased latency) and/or can identify what aspects of the actual page affect performance. For example, the user device or server can generate a report that outlines a procedure for modifying the actual page, where the procedure, when implemented, improves a browser performance metric (e.g., lowers the estimated page load time). The server may transmit the report to the user device for display or otherwise make the report available for access by any device. In addition, the server may host a page optimization service (e.g., a network service, such as a web service) available to page developers that provides the page developers with information on how a browser performs when loading the page developer's page and/or what changes can be made to the page developer's page to improve browser performance.

The set of reference pages may include various subsets of reference pages, where each subset is associated with a particular content parameter. For example, a first subset of reference pages may each include a different value for a first content parameter, such as a page size. A first reference page in the first subset may have a page size of 10 MB, a second reference page in the first subset may have a page size of 20 MB, and so on. Other content parameters may be held constant for the references pages in the first subset. The user device may load each reference page in the first subset and determine a page processing time for each respective reference page. Because just the first content parameter is varied, the page processing times collectively reveal how a change in the first content parameter affects the page processing time.

Likewise, a second subset of reference pages may each include a different value for a second content parameter, such as script complexity. A first reference page in the second subset may have a script complexity of 1, a second reference page in the second subset may have a script complexity of 2, and so on. Again, other content parameters may be held constant for the references pages in the second subset. The user device may load each reference page in the second subset and determine a page processing time for each respective reference page. Because just the second content parameter is varied, the page processing times collectively reveal how a change in the second content parameter affects the page processing time. The set of reference pages may include any number of reference page subsets.

While the techniques disclosed herein are described with respect to page processing or load times, this is not meant to be limiting. The techniques described herein can apply to any browser performance metric. For example, the techniques described herein can be used to estimate or predict a content loading time, a time before the browser begins painting (e.g., displaying content on a screen), a time to document object model (DOM) interactivity, a time to display content above the fold (e.g., a time it takes to display content that is visible in a browser window, excluding dynamic content), and/or the like.

Furthermore, while the techniques disclosed herein are described with respect to browser applications running on user devices, this is not meant to be limiting. The techniques described herein can apply to any application that loads or processes content. For example, the techniques described herein can apply to compilers, coding engines (e.g., encoders or decoders), and/or the like.

System Components

FIG. 1 illustrates a browser testing environment with a user device that tests the performance of a browser using a set of reference pages provided by a server according to one embodiment. The browser testing environment shown in FIG. 1 includes various user devices 102, a server system 104, and various content sources, including origin content servers 106 and content delivery network ("CDN") servers 108. The system components may communicate with each other via one or more communication networks 110. The network 110 may be a publicly accessible network of linked networks, possibly operated by various distinct parties, such as the Internet. In other embodiments, the network 110 may include a private network, personal area network, local area network, wide area network, cable network, satellite network, cellular telephone network, etc. or combination thereof, each with access to and/or from the Internet.

As will be appreciated by those of skill in the relevant art, the network environment may include any number of distinct user devices 102 and/or content sources 106, 108. In addition, multiple (e.g., two or more) server systems 104 may be used. For example, separate server systems 104 may be located so that they are close (in either a geographical or networking sense) to groups of current or potential user devices 102 or content sources 106, 108. In such a configuration, a user device 102 may request reference pages from a server system 104 to which it is closest, rather than all user devices 102 requesting reference pages from a single server system 104.

The user devices 102 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. Alternatively, the user devices 102 may be virtual or emulated applications that simulate the functionality of a computing device. Individual user devices 102 may include a browser application 120 and execute a performance tester 122 to test the browser application 120.

The browser application 120 may be configured to request network-accessible content (e.g., content pages, images, video, etc.) hosted or provided by a content source, such as an origin content server 106 or a CDN server 108, and display a content page. In an embodiment, developers periodically update the browser application 120 and the user device 120 installs the updated browser application 120. The browser application 120 may be a split browser having both user device-side and server-side components. In such configurations, the browser application 120 may perform some tasks on the user device 102 and other tasks, such as rendering tasks, may be performed on an intermediary system. The performance tester 122 may be configured to automatically test the performance of the updated browser application 120 once instructed to do so by a user or developer and provide testing data to the server system 104.

The performance tester 122 may include various modules or components to provide the functionality described herein. For example, the performance tester 122 may include a testing module 123. The testing module 123 may be configured to retrieve reference pages 142 from a reference page data store 140 associated with the server system 104 via the network 110. Alternatively, the references pages 142 may be stored locally on the user device 102, in which case the testing module 123 may retrieve the reference pages 142 from local memory. The reference pages 142 may include various subsets of reference pages, where each subset is associated with a particular content parameter as described above. In an embodiment, once the reference pages 142 are retrieved, the testing module 123 instructs the browser application 120 to load the retrieved reference pages 142. In other embodiments, the browser application 120 retrieves and loads the reference pages 142 when instructed to do so by the testing module 123. The testing module 123 may measure and record the page processing times associated with the loading of each retrieved reference page 142.

The server system 104 can be a computing system configured to process the data measured by the testing module 123. For example, the server system 104 may include a performance tester 143 that processes the data. The performance tester 143 may include an analysis module 144 that collectively analyzes the measured and recorded page processing times. Alternatively, not shown, the user device 102 or a separate system may host the analysis module 144. The analysis module 144 may be configured to develop a model for the updated browser application 120 that estimates a load time of an actual page. For example, the analysis module 144 may determine a relationship between the measured and recorded page processing times and the content parameters associated with the reference pages 142 (e.g., using machine learning techniques). The relationship may be linear, quadratic, logarithmic, and/or any other type of mathematical relationship.

Based on the determined relationship, the analysis module 144 may calculate weights associated with each content parameter. For example, the analysis module 144 may use the determined relationships to identify a value or function (e.g., a weight) that represents how each content parameter affects the page processing time when all other content parameters are held constant. The weight may be a value that indicates a degree to which a change in the content parameter affects the page processing time in a linear manner. The weight may also be a function that incorporates a value of the content parameter such that the function indicates a degree to which a change in the content parameter affects the page processing time in a nonlinear manner (e.g., quadratic, exponential, etc.). The analysis module 144 may further identify a relationship between each of the content parameters. The model developed by the analysis module 144 may thus be a weighted function of the content parameters associated with the reference pages 142.

In an embodiment, the analysis module 144 further estimates a page processing time for an actual page using the developed model. For example, the analysis module 144 may instruct the browser application 120 (via the network 110) to retrieve data associated with the actual page (e.g., the actual page's code), where the data can be used to derive the values of the actual page's content parameters. The data may be retrieved from the origin content server 106 and/or the CDN server 108. The analysis module 144 can input these derived values into the developed model to estimate the page processing time. The analysis module 144 may estimate the page processing time for a plurality of actual pages.

The performance tester 143 may also include a report module 145. Alternatively, not shown, the user device 102 or a separate system may host the report module 145. The report module 145 may be configured to generate a report that indicates the performance of the updated browser application 120 and generate statistics regarding the browser application 120 performance that may be included in the report. For example, the report may textually or graphically provide information that indicates how changes in particular content parameters affect browser performance (e.g., via a bar graph, a line graph, a pie chart, etc.). The report may also compare such information to that collected for a prior version of the browser application 120.

The report module 145 may also use statistical functions (e.g., cumulative distribution functions, univariate or multivariate analyses, probability distributions, etc.) to analyze estimated page processing times individually or in the aggregate. For example, the report module 145 may receive estimated page processing times for thousands to millions of actual pages. The report module 145 can generate a report that textually or graphically indicates the received estimated page processing times and optionally compared them to page processing times estimated using previous versions of the browser application 120. The report module 145 can also apply one or more statistical functions to the estimated page processing times to determine, for example, how changes to the browser application 120 have affected the page processing times for actual pages in the aggregate. The results of applying the one or more statistical functions may include determining an average estimated page processing time, a value of an estimated page processing time that corresponds with the 50th percentile, a value of an estimated page processing time that corresponds with the 90th percentile, and/or the like. These results optionally can be compared with prior versions of the browser application 120. The results may be included in the generated report and/or available separately. The report may be transmitted to the user device 102 or any other device for display and/or accessible via the server system 104.

Furthermore, the report module 145 may be configured to supplement the report with information that identifies the aspects of the architecture of the browser application 120 that affects performance (e.g., the aspects that cause increased or decreased latency) and/or that identifies the aspects of the actual page that affects performance (e.g., which content parameters of the actual page affect performance and by how much). For example, the report may outline a procedure for modifying the actual page (e.g., rewriting code, using different scripts, rearranging content, etc.), where the procedure, when implemented, improves (e.g., lowers) the estimated page load time.

In some embodiments, the server system 104 includes a performance log data store 146. This data store 146 may alternatively be implemented on the user device 102 or a separate server or system. The performance log data store 146 may store the performance of past versions of the browser application 120 with respect to various actual pages and/or the reference pages 142. The performance log data store 146 may also store the models developed for each browser application 120 iteration. The analysis module 144 and/or the report module 145 may access the contents of the performance log 146 to compare current browser application 120 performance with past browser application 120 performance.

The server system 104 can be further configured to store the reference pages 142 in the reference page data store 140 and optionally provide a page optimization service 150. For example, the server system 104 can be a physical server or group of physical servers that may be accessed via the network 110. In some embodiments, the server system 104 may be a proxy server, a system operated by an internet service provider (ISP), and/or or some other device or group of devices that store reference pages and/or provide page optimization services.

In some embodiments, a system, such as the server system 104 or a separate system or server (not shown) includes a page optimization service 150. The page optimization service 150 may be a network service, such as a web service, available to page developers that provides the page developers with information on how the browser application 120 performs when loading the page developer's page and/or what changes can be made to the page developer's page to improve browser performance. For example, the page optimization service 150 may receive information from the analysis module 144 or the report module 145 that provides estimated values on how the browser application 120 will perform when loading various actual pages and/or what aspects of the actual pages may cause performance issues. Page developers can access the page optimization service 150 to receive this information (e.g., via a report that provides suggested improvements) and thereby improve the structure of their respective pages such that the browser application 120 performance is increased when loading such pages.

Example Process for Testing Browser Performance

Figure 2:
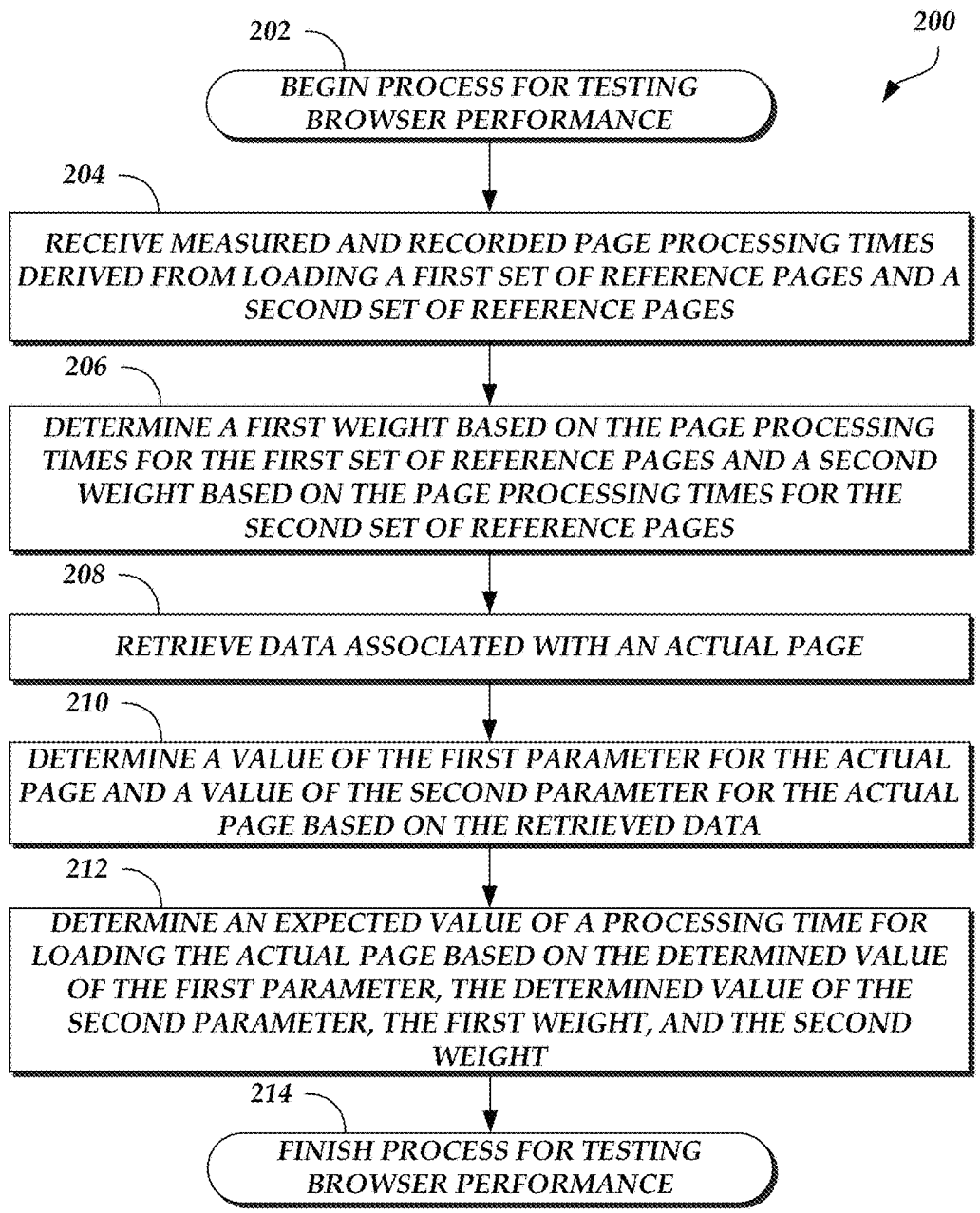
FIG. 2 illustrates a browser performance testing process that may be used by a user device to test the performance of a browser.

FIG. 2 illustrates a browser performance testing process 200 that may be used by a server system to test the performance of a browser. As an example, the server system 104 (e.g., the performance tester 143) of FIG. 1 can be configured to execute the browser performance testing process 200. The browser performance testing process 200 begins at block 202.

At block 204, measured and recorded page processing times derived from loading a first set of reference pages and a second set of reference pages are received. The first set of reference pages may be associated with a first content parameter such that each reference page in the first set has a different first content parameter value. The other content parameters in the first set may be held constant. Likewise, the second set of reference pages may be associated with a second content parameter such that each reference page in the second set has a different second content parameter value. The other content parameters in the second set may be held constant. Each reference page in the first set and in the second set may be loaded by a browser application on the user device 102. A page processing time may be measured and recorded by the user device 102 for each reference page that is loaded. In an embodiment, the page processing times indicate a time to load each respective reference page in the first set and in the second set. The time to load each respective reference page may include the time for building the DOM tree and using it to render the page on the display.

At block 206, a first weight based on the page processing times for the first set of reference pages and a second weight based on the page processing times for the second set of reference pages is determined. In an embodiment, the first weight is determined based on how a change in the first content parameter affects the page processing times for the first set of reference pages. Likewise, the second weight may be determined based on how a change in the second content parameter affects the page processing times for the second set of reference pages. The first weight may be higher than the second weight if an increase in the first content parameter negatively affects the page processing time more than an increase in the second content parameter. The first weight and the second weight may be used to develop a model that estimates page processing time.

At block 208, data associated with an actual page is retrieved. In an embodiment, the data is the code of the actual page may also be metadata about network information associated with the page. The data may be retrieved from the origin content server 106 and/or the CDN server 108.

At block 210, a value of the first parameter for the actual page and a value of the second parameter for the actual page is determined based on the retrieved data. For example, the retrieved data may be used to determine the size of the page (e.g., in bytes), the complexity of the scripts that run when the page is loaded, and/or the like.

At block 212, an expected value of a processing time for loading the actual page is determined based on the determined value of the first parameter, the determined value of the second parameter, the first weight, and the second weight. In an embodiment, the expected value of the processing time for loading the actual page is determined by inputting the determined value of the first parameter and the determined value of the second parameter into the developed model. The expected value of the processing time for loading the actual page may be displayed graphically and/or compared with the expected value of the processing time for previous versions of the browser application. After the expected value of the processing time for loading the actual page is determined, the browser performance testing process 200 may be complete, as shown in block 214.

Example Procedure for Testing and Representing Browser Performance

Figure 3A:
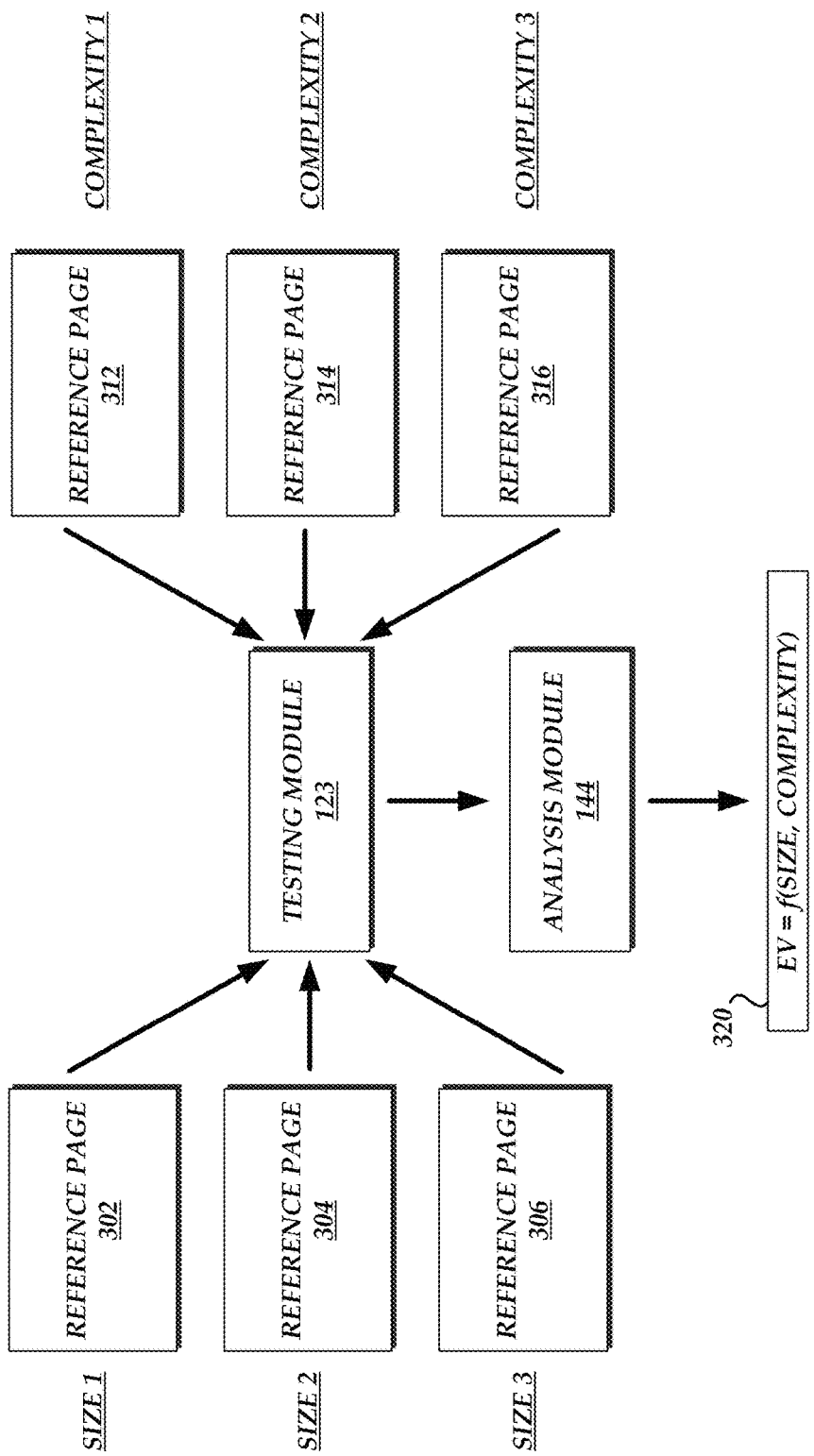
FIGS. 3A-C illustrate an example procedure for testing browser performance and generating a graphical representation of a change in browser performance.
Figure 3B:
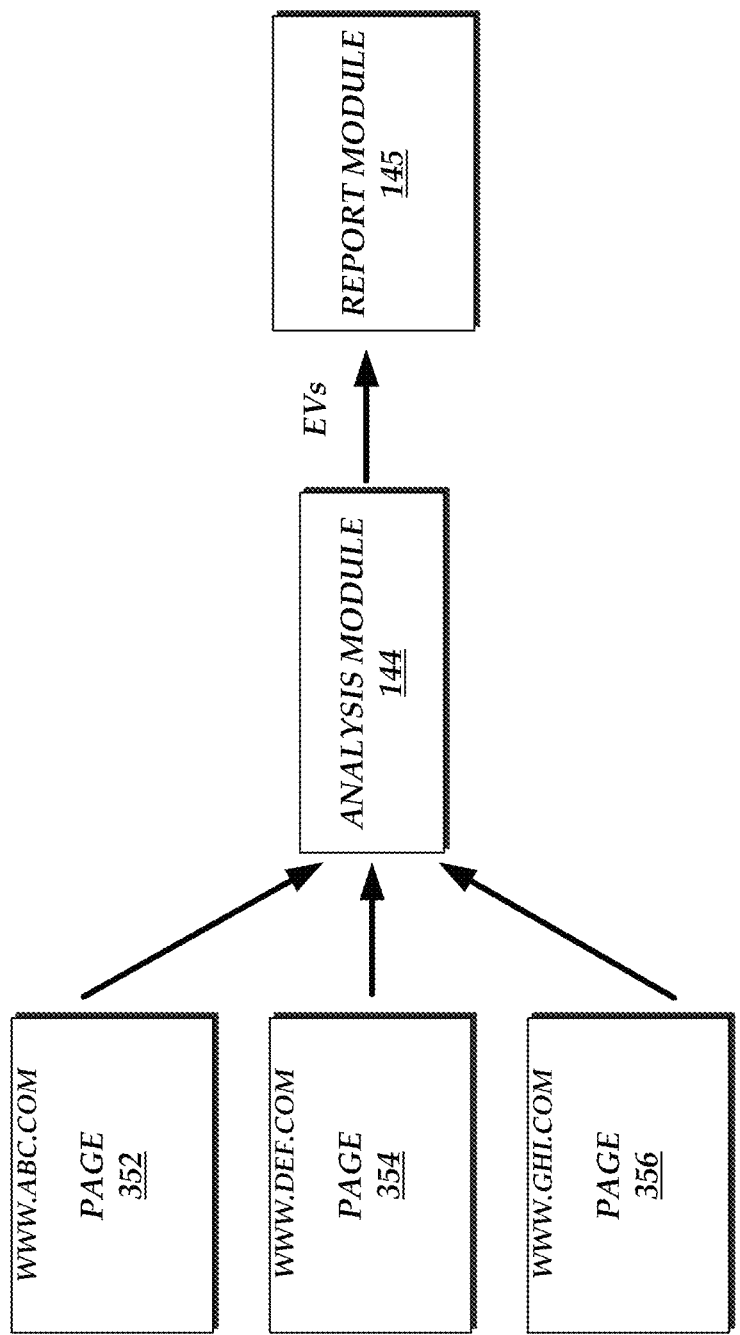
Figure 3C:
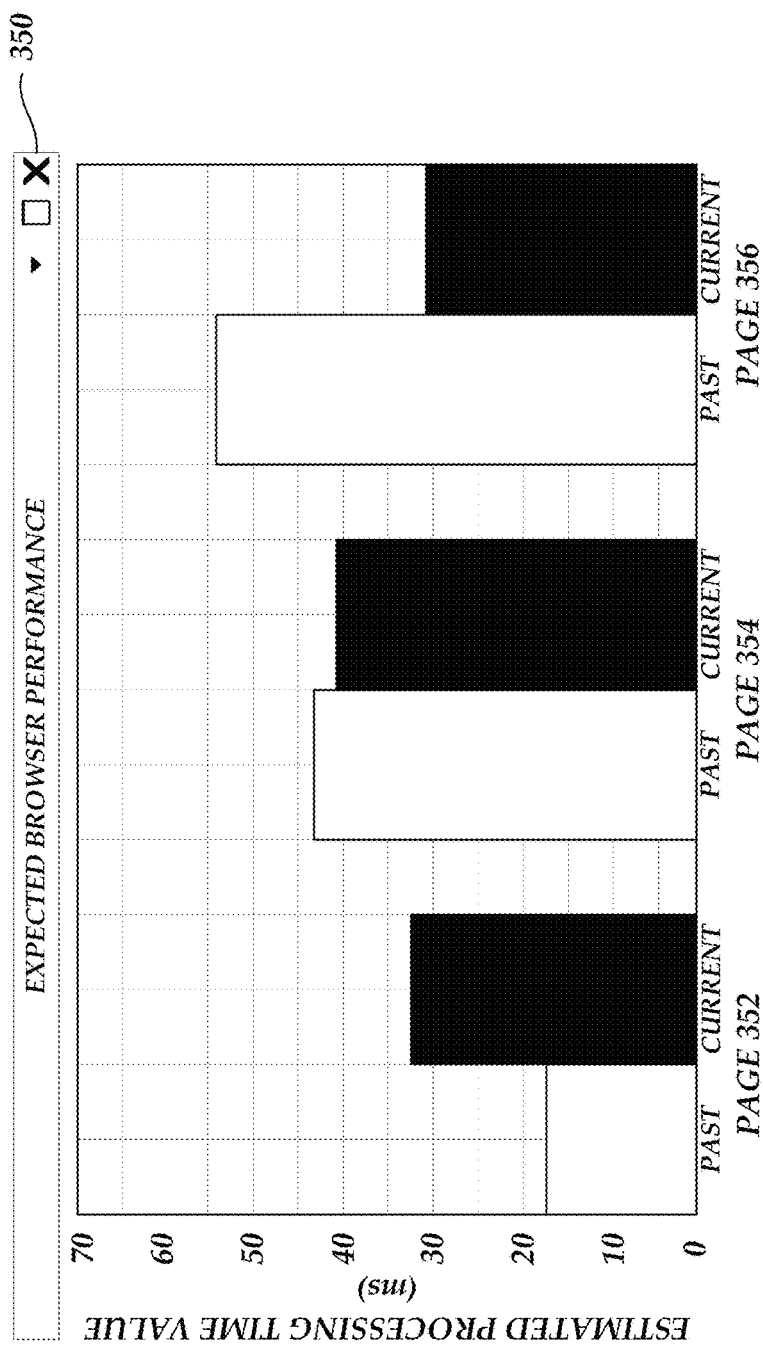

FIGS. 3A-C illustrate an example procedure for testing browser performance and generating a graphical representation of a change in browser performance. As illustrated in FIG. 3A, two subsets of reference pages are present. The first subset of reference pages includes references pages 302, 304, and 306. The content parameter "page size" may be varied in each of reference pages 302, 304, and 306. For example, the reference page 302 may have a page size of 1 (e.g., a small size), the reference page 304 may have a page size of 2 (e.g., a middle size), and the reference page 306 may have a page size of 3 (e.g., a large size). Other content parameters may be held constant across each of the reference pages 302, 304, and 306.

The second subset of reference pages includes references pages 312, 314, and 316. The content parameter "script complexity" may be varied in each of reference pages 312, 314, and 316. For example, the reference page 312 may have a script complexity of 1 (e.g., a small amount of complexity), the reference page 314 may have a script complexity of 2 (e.g., a medium amount of complexity), and the reference page 316 may have a script complexity of 3 (e.g., a large amount of complexity). Other content parameters may be held constant across each of the reference pages 312, 314, and 316.

In an embodiment, the testing module 123 retrieves the reference pages 302, 304, and 306 and instructs the browser application 120 to load each of the pages. The testing module 123 may measure and record the page processing time for each of the reference pages 302, 304, and 306. Likewise, the testing module 123 may retrieve the reference pages 312, 314, and 316 and instructs the browser application 120 to load each of the pages. The testing module 123 may measure and record the page processing time for each of the reference pages 312, 314, and 316.

The testing module 123 may forward the measured page processing times to the analysis module 144. The analysis module 144 may generate a model 320 that can be used to provide an estimated value of the processing time to load a page. The model 320 may be a function of the "page size" content parameter and its associated weight and the "script complexity" content parameter and its associated weight. As described above, the weight may be a value that indicates a degree to which a change in the content parameter affects the page processing time in a linear manner or the weight may be a function that incorporates a value of the content parameter such that the function indicates a degree to which a change in the content parameter affects the page processing time in a nonlinear manner.

As illustrated in FIG. 3B, the analysis module 144 may use the generated model 320 to provide estimated values of the processing time to load three pages 352 (e.g., currently hosted at a network site www.abc.com), 354 (e.g., currently hosted at a network site www.def.com), and 356 (e.g., currently hosted at a network site www.ghi.com). The estimated values of the processing time to load the three pages 352, 354, and 356 may be forwarded to the report module 145.

As illustrated in FIG. 3C, a graph 350 is generated by the report module 145. The graph 350 includes the expected page load times for the pages 352, 354, and 356. The graph 350 further includes the expected page load times for a past version of the browser application 120 and a current version of the browser application 120 for comparison purposes. For example, the report module 145 may retrieve previously generated models and/or previously generated estimated processing time values from the performance log data store 146. The graph 350 may be transmitted to the user device 102 for display and/or provided to a third party (e.g., a page developer).

Additional Embodiments

The server system 104 of FIG. 1 may be a single computing device, or it may include multiple distinct computing devices, such as computer servers, logically or physically grouped together to collectively operate as a server system. The components of the server system 104 can each be implemented in application-specific hardware (e.g., a server computing device) such that no software is necessary, or as a combination of hardware and software. In addition, the modules and components of the server system 104 can be combined on one server computing device or separated individually or into groups on several server computing devices. In some embodiments, the server system 104 may include additional or fewer components than illustrated in FIG. 1.

In some embodiments, the features and services provided by the server system 104 (e.g., the page optimization service 150) may be implemented as web services consumable via the communication network 110. In further embodiments, the server system 104 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

The origin content servers 106 and CDN servers 108 can correspond to logical associations of one or more computing devices for hosting content and servicing requests for the hosted content over the network 110. For example, a content server 106 or CDN server 108 can include a web server component corresponding to one or more server computing devices for obtaining and processing requests for content (such as content pages) from the user devices 102 or other devices or service providers. In some embodiments, one or more content servers 106 may be associated with one or more CDN service providers (e.g., entities that manage multiple CDN servers 108), application service providers, etc.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, and/or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on general purpose computer hardware, or combinations of both. To clearly illustrate this interchangeability of hardware and software, various illustrative components, blocks, modules, and steps have been described above generally in terms of their functionality. Whether such functionality is implemented as specialized hardware versus software running on general-purpose hardware depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method of testing browser performance of a browser application, the method comprising:

as implemented by a computer system comprising one or more computing devices, the computer system configured with specific executable instructions, loading a first plurality of reference pages and a second plurality of reference pages, wherein each reference page in the first plurality of reference pages includes a different value for a first parameter in a plurality of parameters and values for other parameters in the plurality of parameters remain constant, and wherein each reference page in the second plurality of reference pages includes a different value for a second parameter in the plurality of parameters and values for other parameters in the plurality of parameters remain constant;

measuring and recording, for each reference page in the first plurality of reference pages, a page processing time;

measuring and recording, for each reference page in the second plurality of reference pages, a page processing time;

determining a first weight based on the page processing times for the first plurality of reference pages and a second weight based on the page processing times for the second plurality of reference pages;

retrieving data associated with an actual page;

determining a value of the first parameter for the actual page and a value of the second parameter for the actual page based on the retrieved data;

determining an expected value of a processing time for loading the actual page using the browser application based on the determined value of the first parameter, the determined value of the second parameter, the first weight, and the second weight; and comparing the expected value of the processing time for loading the actual page using the browser application with an expected value of the processing time for loading the actual page that is determined using a model associated with a previous version of the browser application.

2. The computer-implemented method of claim 1, further comprising graphically depicting the expected value of the processing time for loading the actual page.

3. The computer-implemented method of claim 1, further comprising generating a report that outlines a procedure for modifying the actual page, wherein the procedure, when implemented, lowers the expected value of the processing time for loading the actual page.

4. The computer-implemented method of claim 1, wherein the first parameter of page content is page size.

5. The computer-implemented method of claim 1, wherein the first parameter of page content is script complexity.

6. The computer-implemented method of claim 1, wherein the first parameter of page content is a number of domains from which page content elements are retrieved.

7. The computer-implemented method of claim 1, wherein determining a first weight further comprises calculating the first weight based on a determined relationship between the first parameter and the page processing times for the first plurality of reference pages.

8. A system for testing browser performance comprising:

a server system comprising hardware, wherein the server system hosts a set of reference pages, the set of reference pages including at least:

a first plurality of reference pages in which a first parameter of page content is varied from reference page to reference page and other parameters of page content remain constant, and a second plurality of reference pages in which a second parameter of page content is varied from reference page to reference page and other parameters of page content remain constant, wherein the server system comprises one or more server computing devices;

a testing module that is configured to run on a client computing device on which a browser application is installed, the testing module configured to at least:

cause the browser application to load each reference page of the set from the server system; and for each reference page of the set, measure and record a respective page processing time, wherein the page processing times corresponding to the first plurality of reference pages reflect how variations in the first parameter of page content affect browser performance, and the page processing times corresponding to the second plurality of reference pages reflect how variations in the second parameter of page content affect browser performance; and an analysis module configured to at least:

cause the browser application to retrieve data associated with an actual page, determine an expected value of a processing time for loading the actual page using the browser application, and compare the expected value of the processing time for loading the actual page using the browser application with an expected value of the processing time for loading the actual page that is determined using a model associated with a previous version of the browser application.

9. The system of claim 8, wherein the analysis module is further configured to at least:

determine a first weight associated with the first parameter based on the page processing times corresponding to the first plurality of reference pages;

determine a second weight associated with the second parameter based on the page processing times corresponding to the second plurality of reference pages;

determine a value of the first parameter and a value of the second parameter for the actual page based on the retrieved data; and determine the expected value of the processing time for loading the actual page based on the determined value of the first parameter, the determined value of the second parameter, the first weight, and the second weight.

10. The system of claim 9, further comprising a report module configured to at least graphically depict the expected value of the processing time for loading the actual page.

11. The system of claim 9, further comprising a report module configured to generate a report that outlines a procedure for modifying the actual page, wherein the procedure, when implemented, lowers the expected value of the processing time for loading the actual page.

12. The system of claim 8, wherein the first parameter of page content is page size.

13. The system of claim 8, wherein the first parameter of page content is script complexity.

14. The system of claim 8, wherein the first parameter of page content is a number of domains from which page content elements are retrieved.

15. A non-transitory computer-readable medium having stored thereon a testing module for testing browser performance, the testing module comprising executable code that, when executed on a computing device having a browser application installed thereon, implements a process comprising:

causing the browser application to load each of a set of reference pages, the set of reference pages including at least:

a first plurality of reference pages in which a first parameter of page content is varied from reference page to reference page and other parameters of page content remain constant, and a second plurality of reference pages in which a second parameter of page content is varied from reference page to reference page and other parameters of page content remain constant;

for each of the reference pages of the set, measuring and recording at least a respective page processing time, wherein the page processing times include time spent by the browser application processing content of the corresponding reference pages, wherein the page processing times corresponding to the first plurality of reference pages reflect how variations in the first parameter of page content affect browser performance, and the page processing times corresponding to the second plurality of reference pages reflect how variations in the second parameter of page content affect browser performance;

causing the browser application to retrieve data associated with an actual page;

determining an expected value of a processing time for loading the actual page using the browser application; and comparing the expected value of the processing time for loading the actual page using the browser application with an expected value of the processing time for loading the actual page that is determined using a model associated with a previous version of the browser application.

16. The non-transitory computer-readable medium of claim 15, further comprising an analysis module for analyzing results of the testing module, the analyzing module comprising executable code that, when executed, implements a process comprising:

determining a first weight associated with the first parameter based on the page processing times corresponding to the first plurality of reference pages;

determining a second weight associated with the second parameter based on the page processing times corresponding to the second plurality of reference pages;

determining a value of the first parameter and a value of the second parameter for the actual page based on the retrieved data; and determining the expected value of the processing time for loading the actual page based on the determined value of the first parameter, the determined value of the second parameter, the first weight, and the second weight.

17. The non-transitory computer-readable medium of claim 16, further comprising a report module for reporting results of the analysis module, the report module comprising executable code that, when executed, implements a process comprising graphically depicting the expected value of the processing time for loading the actual page.

18. The non-transitory computer-readable medium of claim 16, further comprising a report module for reporting results of the analysis module, the report module comprising executable code that, when executed, implements a process comprising generating a report that outlines a procedure for modifying the actual page, wherein the procedure, when implemented, lowers the expected value of the processing time for loading the actual page.

19. The non-transitory computer-readable medium of claim 15, wherein the first parameter of page content is page size.

20. The non-transitory computer-readable medium of claim 15, wherein the first parameter of page content is script complexity.

21. The non-transitory computer-readable medium of claim 15, wherein the first parameter of page content is a number of domains from which page content elements are retrieved.

22. A system for testing browser performance, comprising:
   a server system that hosts a plurality of reference pages, the plurality of reference pages including a first set of reference pages configured to test a first characteristic of browser performance while other characteristics of browser performance remain constant and a second set of reference pages configured to test a second characteristic of browser performance while other characteristics of browser performance remain constant, the server system comprising one or more server computing devices, wherein each reference page in the first set includes a different value for a first parameter and each reference page in the second set includes a different value for a second parameter;
   a testing module that is configured to run on a client computing device on which a browser application is installed, the testing module configured to at least:
      cause the browser application to load each of the reference pages of the set from the server system; and
      for each reference page of the set, measure and record a page processing time,
   wherein the page processing times corresponding to the first set of reference pages reflect the first characteristic of browser performance, and the page processing times corresponding to the second set of reference pages reflect the second characteristic of browser performance; and
   an analysis module configured to at least:
      cause the browser application to retrieve data associated with an actual page;
      determine an expected value of a processing time for loading the actual page using the browser application; and
      compare the expected value of the processing time for loading the actual page using the browser application with an expected value of the processing time for loading the actual page that is determined using a model associated with a previous version of the browser application.

23. The system of claim 22, where the analysis module is further configured to at least:
   determine a first weight associated with the first parameter based on the page processing times corresponding to the first plurality of reference pages;
   determine a second weight associated with the second parameter based on the page processing times corresponding to the second plurality of reference pages;
   determine a value of the first parameter and a value of the second parameter for the actual page based on the retrieved data; and
   determine the expected value of the processing time for loading the actual page based on the determined value of the first parameter, the determined value of the second parameter, the first weight, and the second weight.

24. The system of claim 23, further comprising a report module configured to at least graphically depict the expected value of the processing time for loading the actual page.

25. The system of claim 23, further comprising a report module configured to generate a report that outlines a procedure for modifying the actual page, wherein the procedure, when implemented, lowers the expected value of the processing time for loading the actual page.

26. The system of claim 22, wherein the first parameter of page content is at least one of page size, script complexity, or a number of domains from which page content elements are retrieved.

* * * * *